May 20, 1930.  E. SEASHOLTZ  1,759,717
ADJUSTABLE SIDE BEARING
Filed July 9, 1929
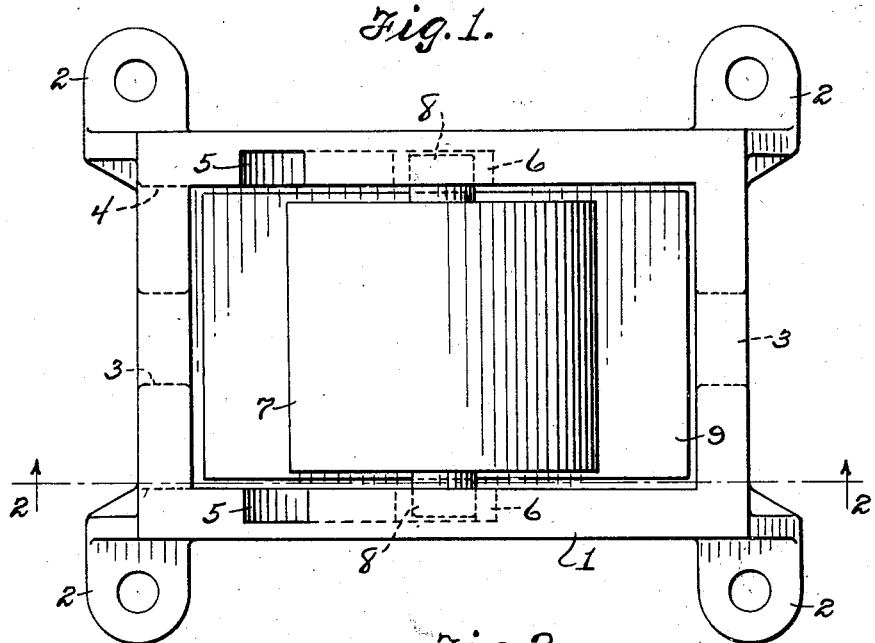
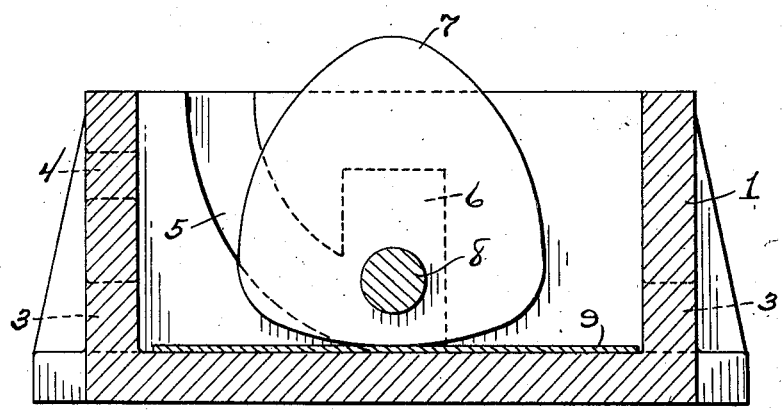
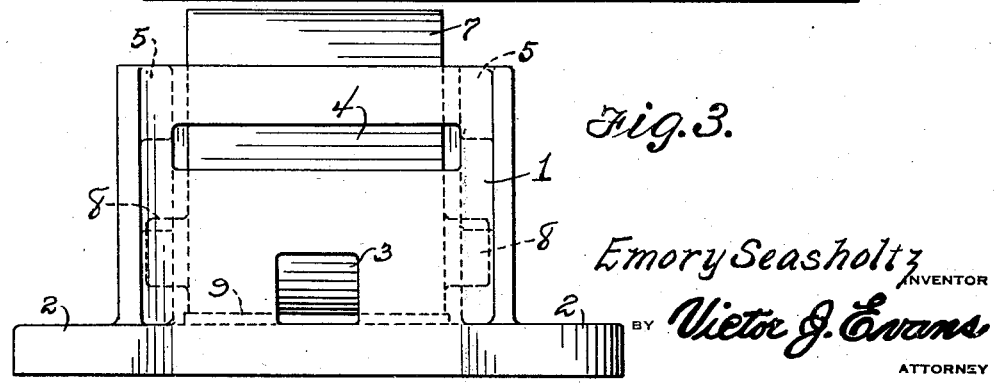
Emory Seasholtz, INVENTOR
BY Victor J. Evans, ATTORNEY Patented May 20, 1930

1,759,717

UNITED STATES PATENT OFFICE

EMORY SEASHOLTZ, OF WAYCROSS, GEORGIA

ADJUSTABLE SIDE BEARING

Application filed July 9, 1929. Serial No. 376,960.

My present invention has reference to a side bearing for the trucks of freight or other cars and has for its object to simplify and improve the construction of such devices by producing a bearing which will drop by gravity into the box therefor, rest upon a shim inserted in the box and will be thereby effectively retained in its box regardless of the vibration or even derailment of the truck, and further one which may be easily and quickly adjusted to take up side bearing clearance without removing the same from its box, but which at the same time may be easily and quickly removed should occasion require.

A still further object is the provision of a bearing for this purpose which may be adjusted more easily and expeditiously and consequently with less expense than is required by the ordinary type of such devices and further wherein such adjustment is obtained without removing any of the bolts, rivets or securing means of the improvement.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 1 is a plan view of my improvement.

Figure 2 is a sectional view taken aproximately on the line 2—2 of Figure 1.

Figure 3 is an end view of the improvement.

Before entering into the details of my construction I think it necessary to state that with the ordinary devices for a similar purpose the bearings which are secured by four rivets must have their rivets cut off when the bearing is to be adjusted, so that shims may be arranged beneath the bearing. This is not only an expensive but laborious operation, as it requires about two hours' time and generally three hands in performing the same. In addition to this the new rivets employed must be heated before the same can be headed, and the cost of adjusting bearings is estimated by the railroads at three dollars per car. It will be noted as the description progresses that with my improvement the bearing can be adjusted by a single hand, that such adjustment may be attained without removing the bearing from its box, and further that the said bearing can be adjusted in approximately ten minutes and further that such adjustment can be obtained at a minimum cost or expense.

As disclosed by the drawings my improvement contemplates the employment of a substantially rectangular box, 1. Each of the boxes has its corner, at its lower end formed with an outwardly directed ear 2 through which ear there are passed the rivets or like securing means that hold the box on the truck or bolster. When the box is once positioned it may not be removed. The box has its ends, adjacent to its bottom wall provided with substantially rectangular openings 3. These openings serve a two-fold purpose, that of inserting the shim which is received between the bearing to elevate the said bearing and prevent the same from accidental movement from the box as well as means for draining water out of the box. Above the opening 3 on one or both ends of the box the said end is formed with a transverse slot 4, the said slot being of a length equalling that of a box between the sides thereof.

The sides of the box, on the inner faces thereof and adjacent the end provided with the slot 4 is formed with a downwardly and inwardly directed curved groove 5, and each of said grooves 5 merges into an upwardly directed substantially rectangular depression 6 formed, of course, upon the inner faces of the side walls of the box.

The roller bearing is substantially elliptical in cross section or more strictly speaking the same is substantially pear-shaped in side elevation. The roller bearing 7 has its sides adjacent to its widened bottom provided with outstanding pins 8, and these pins are of a length approximately equalling the depth of the arcuate or curved grooves 5 and the depth of the notches or depressions 6.

It will be apparent that by canting the roller so that the pins or trunnions 8 may be received in the oppositely disposed arcuate grooves 5 a release of the said bearings will cause the same to gravitate into the said box so that its pins will be received in a line with the rectangular depressions or notches 6. Thereafter I insert through one of the openings 3 a shim 9. This shim is preferably constructed of some cheap metal, such for instance as a boiler sheet and the said shim is of a thickness sufficient to elevate the roller bearing 7 to bring the pins or trunnions thereof in line of contact with the walls between the vertical rectangular depressions or notches and the wall of the arcuate or curved groove adjacent thereto. Thus the shim holds the bearing in its box. When the bearing is to be adjusted to raise the same in the box other shims are inserted beneath the bottom of the bearing. These shims may be either passed through the slot 4, curved downwardly beneath the bearing or pass through one of the openings 3. To remove the shims a chisel or like pointed member is inserted in one of the openings 3 and brought against the shim to lift the same upwardly so that the edge thereof will be passed through the slot 4. In either inserting or removing the shims one hand of the operator may be employed to raise the roller bearing 7 and his other hand employed for inserting or removing the shims. With my improvement the bearing may be elevated to a height approximately one and one-half inches and the simplicity and advantages of my construction will, it is thought, be understood and appreciated without further detailed description.

Having described the invention, I claim:

1. A bearing of the class described comprising a fixed box, a bearing roller in the box having short trunnions in the ends adjacent the bottom thereof, said box having its sides provided with arcuate slots which merge into vertically directed depressions, and which receive therein the trunnions to permit of the bearing gravitating into the box when its trunnions are arranged in the arcuate slots and to dispose its trunnions in a line with the vertical notches, a shim inserted in the box below the bearing for raising the same to bring the trunnions thereof into the notches.

2. A bearing of the class described comprising a fixed box, a bearing roller in the box having short trunnions in the ends adjacent the bottom thereof, said box having its sides provided with arcuate slots which merge into upwardly directed depressions, and which receive therein the trunnions to permit of the bearing gravitating into the box when its trunnions are arranged in the arcuate slots and to dispose its trunnions in a line with the notches, a shim inserted in the box below the bearing for raising the trunnions thereof into the notches, one end of the box having a substantially rectangular opening in a line with the lower wall of said box and having a transverse slot above the opening of a width equalling the distance between the side walls of the box.

In testimony whereof I affix my signature.

EMORY SEASHOLTZ.